Patented Feb. 8, 1927.

1,617,244

UNITED STATES PATENT OFFICE.

ROBERT JAMES FLETCHER, OF IRVINGTON, NEW JERSEY, ASSIGNOR TO THE AMALGAMATED DYESTUFF AND CHEMICAL WORKS, INC., OF NEW YORK, N. Y., A CORPORATION OF NEW YORK.

DIAZO DYE OF DIPHENYL UREA AND CHROMOTROPE ACID.

No Drawing.   Application filed April 19, 1926.   Serial No. 103,149.

This invention relates to a dye compound and method of making same.

The object of the invention is to provide a new dye which forms in the dry, pulverized state a blue violet powder soluble in water, a red violet solution in concentrated sulphuric acid and which does not precipitate in dilution.

I have found that by combining a tetrazo compound of diamido diphenyl urea with chromotrope acid, that a new dye is formed which gives a brilliant fast violet shade soluble in water.

I have found, as a particular example, that by diazotizing para nitroaniline and combining the diazo compound thus obtained with 1:8 dihydroxy 3:6 disulfo naphthalene, then reducing the nitro group of the para nitroaniline and phosgenating the resultant molecule, that I get a direct violet dye having very excellent fastness to light properties.

The following example may serve to illustrate my invention, the parts mentioned being by weight:

13.8 parts of para nitroaniline are diazotized in the usual manner by means of 30 parts of hydrochloric acid 30% and 7.2 parts of sodium nitrite 96%. The diazo solution thus obtained is allowed to run while stirring into an aqueous solution of 1:8 dihydroxy 3:6 disulfo naphthalene prepared from 33.6 parts of this compound, 11.1 parts of soda ash, 0.6 parts of glacial acetic acid, 40.8 parts of sodium acetate crystals, and 40 parts of water. The azo dye separates. This dye is then put into solution with 6 parts caustic soda 100%, 50 parts of water and reduced at 50° C. with 46 parts of sodium sulfide crystals. The mass is then precipitated with 58 parts hydrochloric acid 30%, and filtered.

The reduced cake is dissolved with 40 parts of water and 6 parts of soda ash and is then iced to 0–2° C. 26 parts of sodium acetate crystals and 6 parts of phosgene are then added, and the batch heated to 50° C. and filtered. The filtrate is made alkaline with 6 parts of soda ash, salted out, filtered, dried, and pulverized.

The new dye as above obtained forms in the dry and pulverized state a blue violet powder which is soluble in water to a blue violet solution. In concentrated sulphuric acid the dye dissolves reddish violet and does not precipitate on dilution.

It is obvious to those skilled in the art that my invention is not limited to the foregoing example or to the details given therein. Of course, instead of combining the diazo compound of para nitroaniline with the 1:8 dyhydroxy 3:6 disulfo naphthalene, (a) the diazo compound of p-amino acetanilide azo 1:8 dihydroxy 3:6 disulfo naphthalene might be hydrolyzed and then the resultant compound phosgenated, or (b) tetrazotization of 4:4 diamido diphenyl urea and combination with the 1:8 dihydroxy 3:6 disulfo naphthalene might be affected directly.

It is of course obvious, and I wish it to be understood clearly that the discussion of para nitroaniline as an illustration of a preferred example of my invention is in no way intended to define the limits of the compounds which can be used to produce this dye, as mentioned in the preferred example. The invention concerns the combination of a tetrazo compound of diamido diphenyl urea with chromotrope acid. This combination involves generally the diazotizing of the amino group of the original amino compound, followed by the coupling of this with chromotrope acid after which reduction and phosgenation of the nitro group of the compound takes place.

What I claim is:

A diazo dye, forming in the dry pulverized state a blue violet powder soluble in water, red violet solution in concentrated sulphuric acid, which does not precipitate on dilution, and is especially adapted for fast to light brilliant violet shades, said dye having the formula

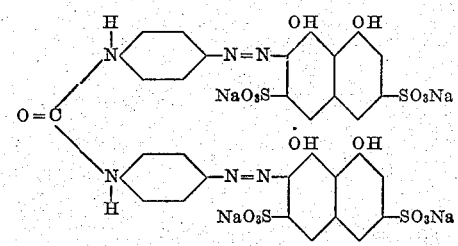

ROBERT J. FLETCHER.